Patented Jan. 2, 1951

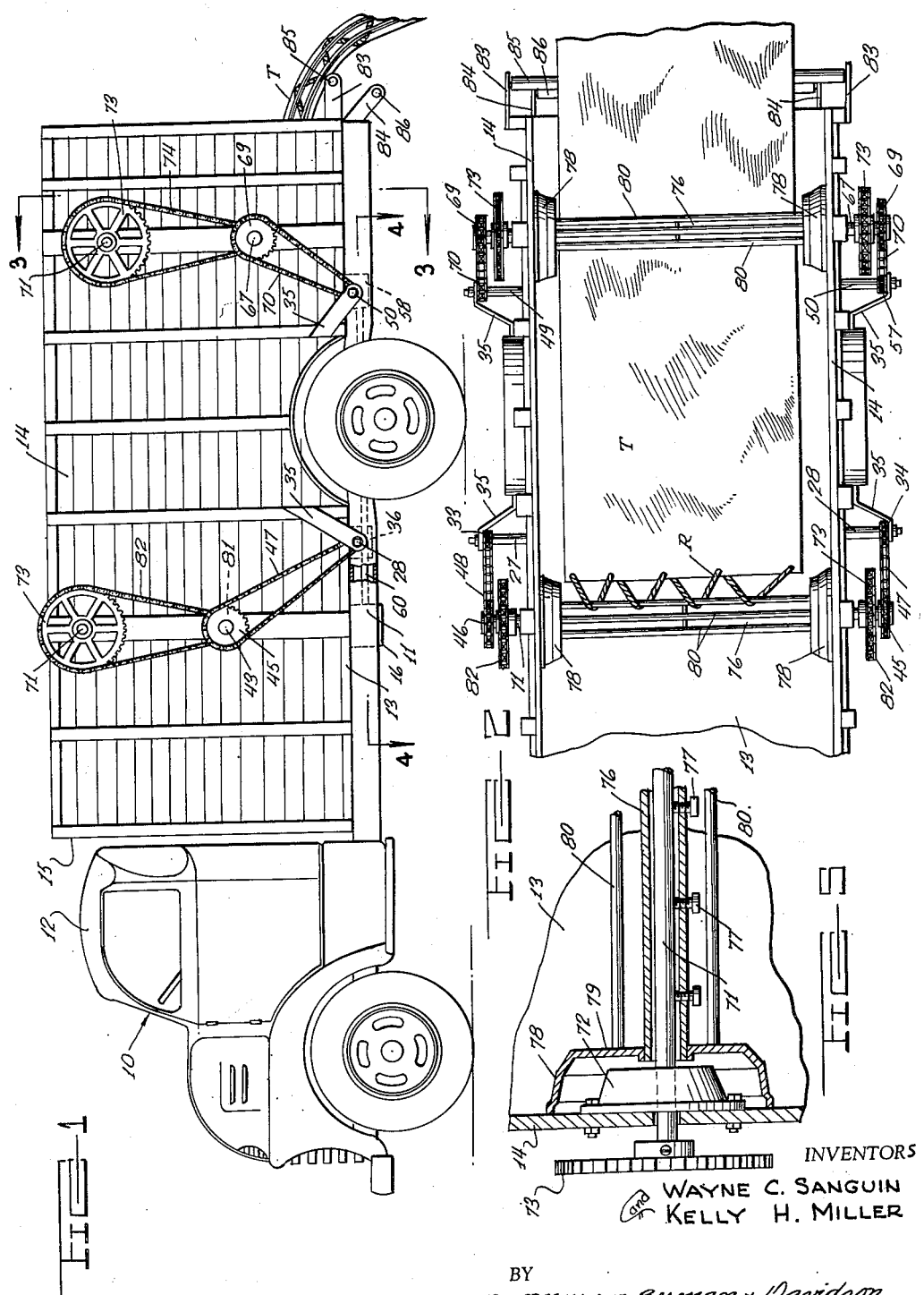

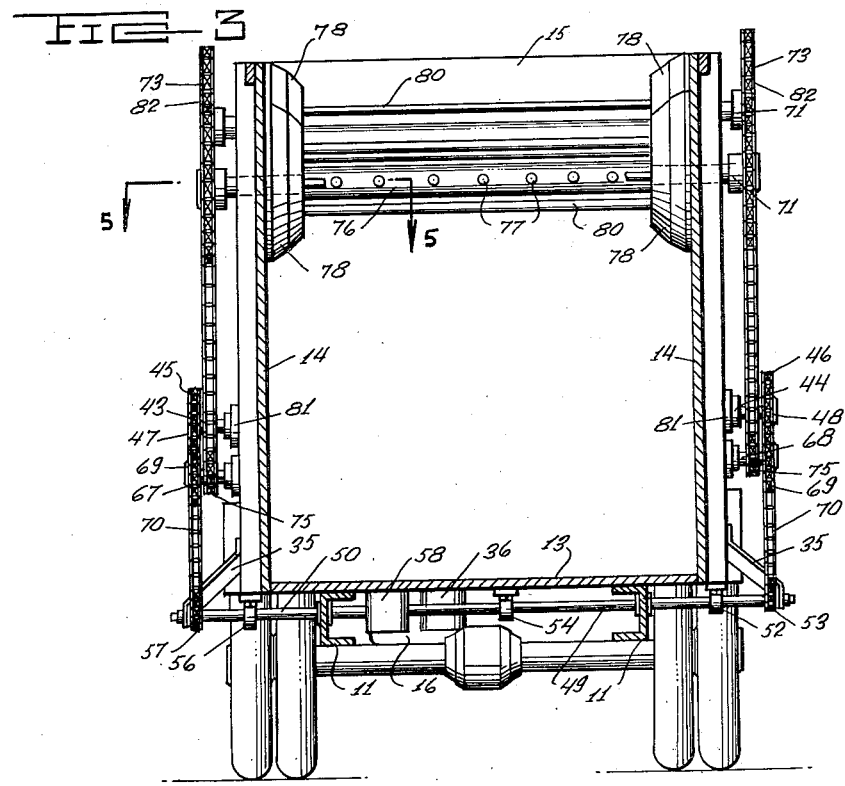

2,536,571

UNITED STATES PATENT OFFICE 2,536,571

MACHINE FOR ROLLING AND STORING LARGE CANVAS TENTS, TARPAULINS, AND THE LIKE

Wayne C. Sanguin and Kelly H. Miller, Hugo, Okla.

Application December 13, 1949, Serial No. 132,718

3 Claims. (Cl. 242—91)

Our invention relates to a machine for rolling and storing large canvas tents, tarpaulins and the like.

A primary object of our invention is to provide a power-operated machine which may be used for rolling up large circus tents and tarpaulins of the type used for covering athletic fields into a highly compact and neat roll for storage.

A further object is to provide a machine of the above-mentioned character which is highly simplified in construction, compact, strong and durable.

A further object is to provide a machine of the above-mentioned character which may be constructed upon a conventional truck chassis or incorporated in a separate trailer unit or the like.

A still further object of the invention is to provide a device of the above-mentioned character which will be relatively cheap to build and which will prolong the life of a canvas tent or tarpaulin and save much labor in the handling of tents and tarpaulins.

Other objects and advantages of the invention will be apparent during the course of the following description.

In the accompanying drawings forming a part of this application, and in which like numerals are employed to designate like parts throughout the same:

Figure 1 is a side elevation of a machine embodying our invention, and showing the same constructed upon a conventional motor truck;

Figure 2 is a fragmentary top plan view of the machine illustrated in Figure 1;

Figure 3 is a transverse vertical section taken on line 3—3 of Figure 1;

Figure 4 is a horizontal fragmentary section taken on line 4—4 of Figure 1; and

Figure 5 is an enlarged fragmentary horizontal section taken on line 5—5 of Figure 3.

In the drawings, where, for the purpose of illustration, is shown a preferred embodiment of our invention, the numeral 10 designates a conventional motor truck including a horizontal main frame or chassis 11 which extends longitudinally rearwardly of and below the cab 12 of the truck. The truck 10 further includes an open box-type body including a horizontal, flat bed or floor 13 suitably rigidly secured to the frame 11. The truck body includes opposed, vertical, upstanding sides 14 rigidly secured to the bed 13 at the opposite, longitudinal side edges of the bed. The upstanding sides 14 are quite tall, as shown, and preferably extend above the roof of the cab 12.

The rear end and top of the truck body are open, as shown, but the body includes a forward, vertical end 15 mounted upon the forward end of the bed 13 and rigidly connecting the forward ends of the upstanding sides 14.

Rigidly mounted upon the frame 11 rearwardly of the cab 12 and disposed below the floor or bed 13 and close to such bed is a gear box or transmission 16 disposed near the transverse center of the frame 11. Mounted within the gear box 16 is a central, horizontal, rotatable shaft 17 having a drive gear 18 secured thereto for rotation therewith. The shaft 17 extends forwardly of the forward side of the gear box 16, Figure 4, and is coupled through a universal joint 19 with a horizontal, longitudinally forwardly extending drive shaft 20 operatively connected with a standard power take-off shaft, not shown, extending from the rear side of the transmission of the truck. Rotatably mounted within the gear box 16 upon opposite sides of the shaft 17 are horizontal, longitudinally extending, rotatable shafts 21 and 22 having axially shiftable gears 23 and 24 mounted thereon for rotation therewith. Gear shifting rods or levers 25 and 26 are operatively connected with the gears 23 and 24 for shifting them longitudinally or axially upon their shafts 21 and 22. The rods 25 and 26 are adapted to shift the gears 23 and 24 into and out of engagement with the central gear 18, so that rotation may be imparted to either one of the shafts 21 and 22, or to both of such shafts simultaneously, by the central drive gear 18. The rods 25 and 26 extend forwardly longitudinally from the gear box 16 and are operatively connected with hand or foot-operated levers, not shown, suitably mounted adjacent to the driver's seat and within the cab 12.

Longitudinally rearwardly of the gear box 16, horizontal, transversely extending, rotatable shafts 27 and 28 are journaled in suitable bearings 29 and 30 mounted upon the truck frame 11, as shown, and laterally outwardly of the frame 11 and bearings 29 and 30 additional bearings 31 and 32 are provided, and rigidly secured to the bottom of the truck bed 13 near the opposite sides of the same and outwardly of the frame 11. The shafts 27 and 28 extend longitudinally outwardly beyond the bearings 31 and 32, and secured to the shafts 27 and 28 near their outer ends for rotation therewith are small sprocket wheels 33 and 34. The shafts 27 and 28 extend slightly outwardly of the sprocket wheels 33 and 34, and such outer ends are journaled within bearing braces or arms 35 rigidly mounted upon the outer faces of the truck sides 14 near the bottoms of the same, Figures 1 and 3. The inner ends of the shafts 27 and 28 are spaced apart and are journaled within opposite sides of a gear casing 36 within which a short, longitudinally extending, horizontal shaft 37 is journaled for rotation. The shaft 37 extends longitudinally forwardly of the gear casing 36 and is operatively connected through a universal joint 38 with the rear end of the shaft 21. Secured to the shaft 37 for rotation therewith are a pair of longitudinally spaced driving bevel gears 39 and 40 operatively engaging driven bevel gears 41 and 42, respectively, mounted within the gear casing 36 and secured to the inner ends of the shaft 27 and 28 for rotation therewith. It is thus seen that rotation of the shaft 37 by the shaft 21 will cause the shafts 27 and 28 to rotate in the same direction.

Longitudinally forwardly of the shafts 27 and 28, and above such shafts, a pair of aligned, laterally outwardly extending, short shafts 43 and 44 are rotatably mounted upon the outer sides or faces of the upstanding body sides 14, and these shafts 43 and 44 are preferably arranged near the vertical center of the truck body, Figure 1. Sprocket wheels 45 and 46 are secured to the outer ends of the shafts 43 and 44 for rotation therewith and arranged in alignment with the small sprocket wheels 34 and 33 of the shafts 27 and 28. Sprocket chains 47 and 48 serve to operatively connect the pairs of sprocket wheels 34 and 45 and 33 and 46, and these sprocket chains 47 and 48 are arranged outwardly of the upstanding sides 14, as shown.

Longitudinally rearwardly of the shafts 27 and 28, transversely extending, horizontal, rotatable shafts 49 and 50 are arranged parallel to the shafts 27 and 28 and disposed at the same elevation as such shafts. The shaft 49 is longer than the shaft 50, Figure 4, and is journaled within a suitable bearing 51 rigidly secured to one side of the truck frame 11, and longitudinally outwardly of the bearing 51 an additional bearing 52 rotatably receives the shaft 49, and the bearing 52 is rigidly mounted upon the bottom of the truck bed 13 adjacent to its right-hand side, Figure 3. Longitudinally outwardly of this bearing 52, a relatively small sprocket wheel 53 is secured to the shaft 49 near its outer end and disposed laterally outwardly of the adjacent side 14. Outwardly of the sprocket wheel 53, a bearing brace or arm 35 rotatably receives the outer end of the shaft 49 for additionally supporting the same, and this bearing brace 35 is rigidly secured to the outer face of the adjacent side 14 near the bottom of such side. An additional bearing 54 rotatably receives the shaft 49 near the transverse center of the truck body, and the bearing 54 is rigidly secured to the bottom of the bed 13, as shown in Figure 3. The relatively short shaft 50 is journaled within a suitable bearing 55 rigidly secured to the opposite side of the truck frame 11, and another bearing 56 rotatably receives the shaft 50 longitudinally outwardly of the bearing 55, and this bearing 56 is rigidly mounted upon the bottom of the bed 13 near the left-hand side of the bed, Figure 3. The shaft 50 extends laterally outwardly beyond the adjacent side 14, and is equipped near its outer end with a sprocket wheel 57, identical with the sprocket wheel 53. Outwardly of the sprocket wheel 57, one of the bearing braces 35 rotatably receives and supports the outer end of the shaft 50, and this bearing brace is rigidly secured to the outer face of the adjacent truck side 14. The inner ends of the shafts 49 and 50 are journaled within the opposite sides of a gear casing 58 disposed longitudinally rearwardly of the gear casing 36 and spaced laterally therefrom and toward the left-hand side of the frame 11, as shown in Figure 4. Rotatably mounted within the gear casing 58 is a short, longitudinally extending, horizontal, rotatable shaft 59 having its forward end extending forwardly of the gear casing 58 and operatively connected with the rear end of a longitudinally extending drive shaft section 60 through a universal joint or coupling 61. The forward end of the drive shaft section 60 is operatively connected through another universal joint 62 with the rear end of the shaft 22. The drive shaft section 60 is disposed beneath and close to the bed 13, but is arranged at an elevation slightly below the transverse shaft 28 so that it will clear such shaft. Mounted within the gear casing 58 and secured to the shaft 59 for rotation therewith are a pair of longitudinally spaced driving bevel gears 63 and 64 operatively engaging driven bevel gears 65 and 66, respectively, in turn secured to the inner ends of the shafts 50 and 49, respectively, for rotation therewith. It is thus seen that rotation of the shaft 59, which may be driven by the shaft 22, is imparted to the shafts 49 and 50, and these shafts will rotate in the same direction simultaneously.

Disposed longitudinally rearwardly of the shafts 49 and 50 and at an elevation above the same are a pair of short, laterally outwardly extending shafts 67 and 68 similar to the shafts 43 and 44 and arranged at a slightly lower elevation than the shafts 43 and 44, Figure 1. Secured to the shafts 67 and 68 for rotation therewith and spaced laterally outwardly of the sides 14 are sprocket wheels 69 similar to the sprocket wheels 45 and 46, and the sprocket wheels 69 are arranged in alignment with the relatively small sprocket wheels 53 and 57, and operatively connected therewith by sprocket chains 70. Like the sprocket chains 47 and 48, the sprocket chains 70 operate adjacent to the outer sides or faces of the sides 14. As shown in Figure 1, the sprocket chains 70 and associated elements are arranged near and slightly forwardly of the rear end of the truck body.

Disposed vertically above the shafts 67 and 68 and near and below the tops of the sides 14, and extending horizontally and transversely between the sides 14 is a horizontal, rotatable roller shaft 71 having its opposite ends extending slightly outwardly of the sides 14. The roller shaft 71 is journaled near its opposite ends in bearings 72 rigidly secured to the inner faces of the sides 14 of the truck body, and large sprocket wheels 73 are secured to the opposite ends of the shaft 71 outwardly of the sides 14 for rotation therewith. Vertically extending sprocket chains 74 are trained over the large sprocket wheels 73 and operatively engage lower sprocket wheels 75 which are secured to the short shafts 67 and 68 inwardly of the sprocket wheels 69 thereof. Mounted upon the roller shaft 71 and extending for substantially the entire length of such shaft between the opposite sides 14 is a horizontally disposed pipe or tube 76 rigidly secured to the shaft 71 for rotation therewith by means of a plurality of longitudinally spaced set screws 77, Figure 5. The opposite ends of the tube 76 terminate adjacent to the inner sides of the bearings 72, and rigidly secured by welding or the like to the opposite ends of the tube 76 are circular, hollow shields or cover plates 78 which rotatably engage over the bearings 72, as shown, and have their outer peripheral edges arranged close to the inner faces of the sides 14, Figure 5. The bearing shields 78 include inner, vertically disposed sides 79 to which are rigidly secured the opposite ends of transversely extending bars or roller rods 80 which are spaced radially of the tube 76 and extend parallel thereto. The tube 76, end shields 78 and bars 80 thus form a unitary spool or roller for receiving the folded tent or tarpaulin to be rolled up. The elements 76 and 80 are horizontally disposed, as shown, and are spaced a substantial distance above the bed or floor 13 of the truck.

A substantially identical spool or roller device is arranged vertically above the short shafts 43 and 44, Figure 1, and spaced longitudinally forwardly of the sprocket wheels 73 and associated elements and at a slightly higher elevation than such elements. This forward spool or roller device comprises another of the shafts 71 journaled in another pair of the bearings 72 mounted upon the sides 14, as previously described. Another set of the sprocket wheels 73 are secured to the opposite ends of the forward shaft 71 and lie adjacent to the outer surfaces of the sides 14, as shown. The remainder of the construction of the forward roller or spool device is identical with the rear spool device including the elements 78, 79, 76, 77 and 80, all previously shown and described in connection with the rear spool or roller device. The forward pair of sprocket wheels 73 are arranged in vertical alignment with a pair of lower sprocket wheels 81 mounted upon the short shafts 43 and 44 for rotation therewith. Forward sprocket chains 82 similar to the sprocket chains 74 are operatively connected with the forward sprocket wheels 73 and 81, as shown. It is thus evident that rotation of the shafts 27 and 28 and 49 and 50 will impart rotation to the forward and rear sets of sprocket wheels 73 and associated elements.

Adjacent to the rear end of the truck body and projecting rearwardly longitudinally thereof adjacent to the opposite sides of the body are pairs of extensions or arms 83 and 84, the arms 84 being downwardly inclined, as shown in Figure 1. Journaled upon the rear ends of the pairs of arms 83 and 84 are horizontal, transversely extending, elongated guide rollers 85 and 86 which extend transversely for substantially the entire width of the truck body and are spaced longitudinally rearwardly of the same. The roller 85 is disposed substantially at the elevation of the bed 13, while the roller 86 is disposed somewhat below the bed, as shown in Figure 1. The rollers 85 and 86 engage beneath the tent or the like being rolled up or unrolled, and prevent the same from hanging up or becoming tangled with the rear end of the truck body.

The operation of the machine is as follows:

Through manipulation of the rods 25 and 26 from the cab 12 of the truck, rotation can be imparted to either one or both of the shafts 21 and 22. Likewise, through the gearing in the gear cases 36 and 58, rotation may be imparted to the pairs of shafts 27 and 28 and 49 and 50, as desired. Such rotation of the shafts 27 and 28 and 49 and 50 will accordingly cause either one or both of the upper shafts 71 to rotate through the action of the sprocket chains 74 and 82, and associated elements. When either or both of the shafts 71 rotate, their associated tubes 76 and rods or bars 80 will, of course, rotate with them.

When it is desired to roll up a large circus tent or the like for transportation by the truck 10, such tent, which may be designated by the letter T, is first folded into an elongated section or strip substantially equal to the distance between the bearing shields 78 of the rollers or spools. By manipulation of the rod 26, the gear 24 may be shifted out of engagement with the central gear 18, while the gear 23 is arranged in engagement with the central gear 18. With this arrangement, rotation will be imparted to the shafts 27 and 28, but not to the shafts 49 and 50. Accordingly, the forward shaft 71 will rotate, while the rear shaft 71 and associated elements will remain stationary. With all of the parts at rest, the ropes R of the tent are tied about one of the bars 80 carried by the forward roller shaft 71, as shown in Figure 2. The truck 10 is, of course, arranged longitudinally of the folded tent, and the engine of the truck is started for imparting rotation to the shaft 20, which through the transmission 16, as adjusted, will impart rotation to the shafts 27 and 28 and the forward roller shaft 71. The tent T will be wound upon the roller including the bars and tubes 76, and arranged in a compact roll adjacent to the forward end of the truck body. In another tent, large tarpaulin or the like is to be likewise rolled up for transportation on the truck, the gear 24 may be shifted into engagement with the gear 18, and the gear 23 shifted out of engagement with the gear 18, so that the forward roller shaft 71 will not rotate. When the shaft 20 is now driven, only the rear roller shaft 71 will rotate, and the second tent or the like may be rolled up by the rear shaft 71 and associated elements and disposed in a compact roll adjacent to the rear end of the truck body. Since large circuit tents, athletic field tarpaulins, and the like, are very heavy and unwieldly, the use of our machine for rolling them up saves a great deal of time and labor. When it is desired to unroll the tents or tarpaulins which have been rolled upon the shafts 71 and associated elements, the trailing end of the tent may be tied or secured to some fixed object, and the truck may be driven slowly forwardly for unrolling the tent from its roller. The machine is highly simplified and compact, extremely sturdy and easy to use.

It is to be understood that the form of our invention herewith shown and described is to be taken as a preferred example of the same, and that various changes in shape, size and arrangement of parts may be resorted to without departing from the spirit of our invention or the scope of the subjoined claims.

Having thus described our invention, we claim:

1. A machine for rolling up large tents and the like, comprising a truck including an engine and a body having opposed upstanding sides, a first transverse substantially horizontal rotatable spool journaled upon the sides of the body and disposed near the front end of the body and near the tops of the upstanding sides, a second transversely extending substantially horizontal spool journaled upon the upstanding sides of the body near the rear end of the body and arranged substantially at the elevation of the first-named spool, transverse horizontal shafts journaled upon the body below and adjacent to the first and second-named spools, gearing connecting the spools and transverse shafts, a power take-off shaft connected with the engine of the truck to be driven thereby, and gearing including a slide transmission operatively connecting the power take-off shaft and said transverse shafts for driving said spools separately or in unison.

2. A machine for rolling up a large tent or the like for transporting it, comprising a truck including an engine and a body including upstanding spaced-apart sides, a forward horizontal rotatable spool journaled upon said spaced-apart sides and extending for substantially the entire distance between them, said forward spool being disposed near the tops of said spaced-apart sides, a rear transversely extending horizontal rotatable spool journaled upon the spaced-apart sides near the tops thereof and extending for substantially the entire distance between them, pairs of transversely extending horizontal shafts arranged near and below the bottom of the truck body and adjacent to the forward and rear rotatable spools, gear casings disposed beneath the bottom of the truck body and connected with said transverse rotatable shafts, a slide transmission mounted upon the truck beneath the truck body and disposed forwardly of the forward rotatable roller, a drive shaft operatively connected with the slide transmission and with one of said gear casings, a second drive shaft operatively connected with said slide transmission and with the other of said gear casings, and a power take-off shaft operatively connected with the engine of the truck and with the slide transmission so that rotation may be imparted through the slide transmission and gear casings to said horizontal transverse rotatable shafts.

3. A machine for rolling up a large tent or the like for transportation, comprising a truck including an engine and a body having spaced opposed upstanding sides, a transversely extending substantially horizontal spool journaled upon the upstanding sides near the tops thereof and extending for substantially the entire distance between the sides, sprocket wheels connected with the opposite ends of the spool and disposed outwardly of the upstanding sides of the body, intermediate short rotatable shafts mounted upon the sides of the body below the sprocket wheels of the spool, sprocket wheels secured to the short rotatable shafts, first sprocket chains operatively connecting the sprocket wheels of the spool and the sprocket wheels of the short rotatable shafts, second sprocket wheels mounted on the short rotatable shafts, second sprocket chains operatively engaging the second sprocket wheels, transversely extending horizontal rotatable separate shaft sections journaled upon the truck body adjacent to the bottom thereof, a sprocket wheel secured to each shaft section adjacent to its outer end, the sprocket wheels of the shaft sections being arranged in alignment with the second sprocket wheels of the short shafts, said second sprocket chains operatively engaging the sprocket wheels of said separate shaft sections, bevel gears secured to the inner ends of said separate shaft sections, a longitudinally extending shaft mounted adjacent to the inner ends of the separate shaft sections, longitudinally spaced bevel gears secured to the last-named shaft and engaging the bevel gears of the separate shaft sections, and gearing operatively connecting said longitudinal shaft between the inner ends of said separate shaft sections and the engine of the truck, whereby rotation may be imparted to said rotatable spool.

WAYNE C. SANGUIN.
KELLY H. MILLER.

REFERENCES CITED

The following references are of record in the file of this patent:

UNITED STATES PATENTS

| Number | Name | Date |
|---|---|---|
| 2,250,269 | Lockwood | July 22, 1941 |
| 2,355,441 | Jacob | Aug. 8, 1944 |
| 2,467,869 | Spillman | Apr. 19, 1949 |